United States Patent [19]

Protze

[11] 4,285,545

[45] Aug. 25, 1981

[54] AUTOMOBILE PASSENGER SEAT WITH AN AUTOMATICALLY POSITIONED HEADREST

[75] Inventor: Dieter Protze, Wolfsburg, Fed. Rep. of Germany

[73] Assignee: Volkswagenwerk Aktiengesellschaft, Wolfsburg, Fed. Rep. of Germany

[21] Appl. No.: 16,545

[22] Filed: Mar. 1, 1979

[30] Foreign Application Priority Data

Nov. 3, 1978 [DE] Fed. Rep. of Germany ....... 2810577

[51] Int. Cl.³ .................... B60R 21/10; A62B 35/00
[52] U.S. Cl. ................................ 297/483; 296/65 R; 297/61; 297/216; 297/410
[58] Field of Search ................ 297/410, 61, 408, 468, 297/483, 344, 216, 391; 248/393, 429; 280/808, 751, 802; 296/65 R

[56] References Cited

U.S. PATENT DOCUMENTS

| | | | |
|---|---|---|---|
| 2,181,465 | 11/1939 | Schneider | 297/61 |
| 2,985,229 | 5/1961 | Shamblin | 297/410 |
| 3,427,073 | 2/1969 | Downs et al. | 297/410 X |
| 3,454,303 | 7/1969 | Dangauthier | 297/410 X |
| 3,471,198 | 10/1969 | Homier et al. | 297/410 |
| 3,712,666 | 1/1973 | Stoll | 297/61 |
| 3,888,540 | 6/1975 | Protz | 297/408 |
| 3,942,835 | 3/1976 | Harrison | 297/61 |
| 3,958,827 | 5/1976 | Ré | 297/61 |
| 4,040,661 | 8/1977 | Hogan et al. | 297/61 |
| 4,222,608 | 9/1980 | Maeda | 297/391 X |

FOREIGN PATENT DOCUMENTS

| | | | |
|---|---|---|---|
| 2232726 | 1/1974 | Fed. Rep. of Germany | 297/216 |
| 2447874 | 10/1974 | Fed. Rep. of Germany | |
| 2305150 | 10/1976 | France | 297/410 |
| 2365985 | 4/1978 | France | 297/216 |
| 1218541 | 3/1968 | United Kingdom | 297/410 |

Primary Examiner—James T. McCall
Attorney, Agent, or Firm—Brumbaugh, Graves, Donohue & Raymond

[57] ABSTRACT

An automobile driver or passenger seat which is adjustable in the lengthwise direction of the vehicle and has a backrest and headrest supported on the backrest and vertically adjustable in relation thereto. The position of the headrest is adjusted automatically to its optimum position in response to the back and forth movement of the seat, for moving the headrest upwardly away from the backrest when the seat is moved backward, and for moving the headrest downwardly when the seat is moved forwardly. Thus, the headrest will automatically be adjusted to the correct height of the passenger occupying the seat, as he adjusts the position of the seat itself. In one form of the invention, the adjustment mechanism is hydraulic and includes a pair of hydraulic cylinders, one cylinder actuated in response to movement of the seat, and the other cylinder, attached to the headrest, actuated in response to movement of the piston in the first piston and cylinder unit. In other forms of the invention, mechanical actuating means are shown and described.

20 Claims, 6 Drawing Figures

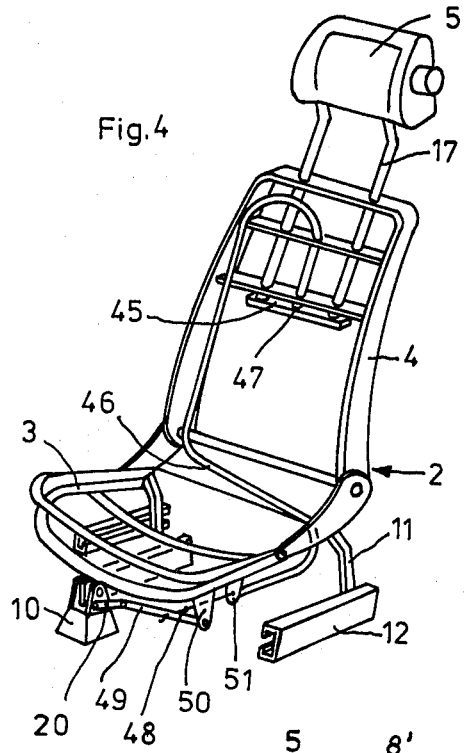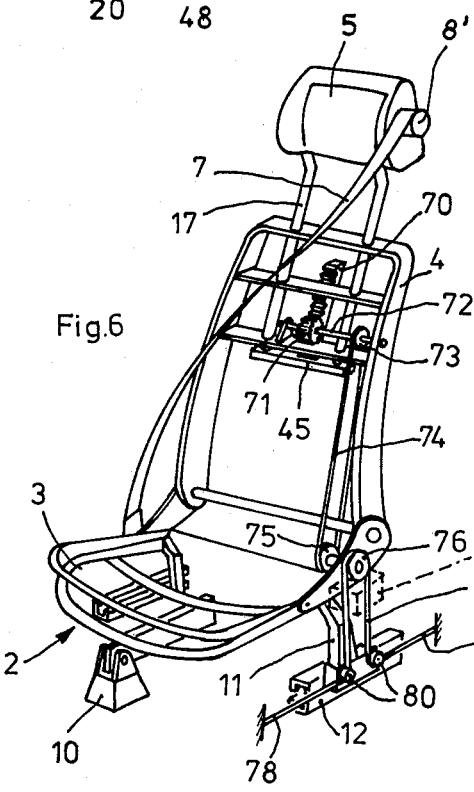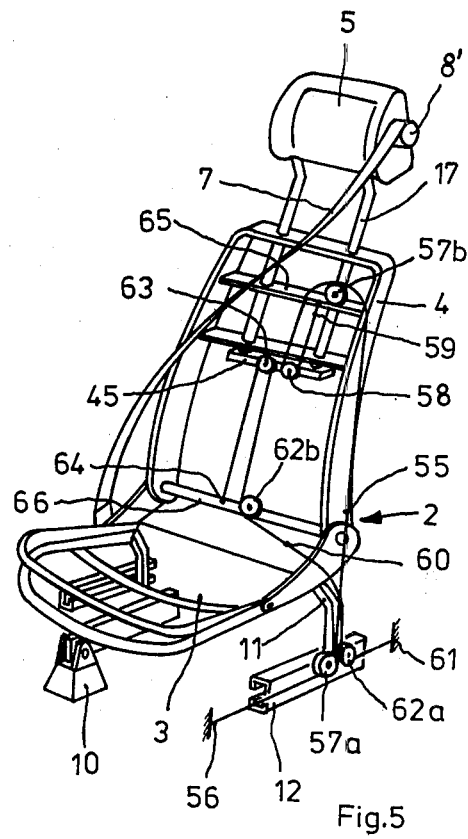

4,285,545

AUTOMOBILE PASSENGER SEAT WITH AN AUTOMATICALLY POSITIONED HEADREST

BACKGROUND OF THE INVENTION

The invention relates to a passenger seat for a motor vehicle which is adjustable in the lengthwise direction of the vehicle and includes a backrest with a head support supported vertically thereon and adjustable with respect thereto.

Headrests attached to the backrest of a passenger vehicle seat provide optimum protection for passengers, in the case of an accident, when they are positioned at a level even with the head of the passenger or driver. Since vehicle occupants will vary in height, the headrest must be individually adjusted according to the height of the passenger or driver, raised for taller persons and lowered for shorter passengers. Vehicle passengers, however, often do not bother to adjust the height of the headrest because it is inconvenient, so that as a practical matter the headrests are rarely at the right level. The result of this is that in an accident, passengers run the risk of sustaining severe injuries, in particular to the neck vertebrae, due to the fact that maladjusted headrests will not offer protection.

SUMMARY OF THE INVENTION

In accordance with the present invention, an automobile passenger seat includes a headrest vertically and adjustably supported on the backrest of the seat, which is automatically adjusted to the individual height of each driver or passenger thereby to adjust the headrest individually to the proper height in each case.

More particularly, in accordance with the present invention, means are provided for automatically adjusting the height of the headrest in response to changes in the longitudinal position of the passenger seat so that the headrest will be moved upwardly when the seat is shifted back, and will be lowered when the seat is shifted forward. This will provide a proper automatic adjustment of the headrest due to the relationship between the proper headrest level of a driver or passenger and the seat adjustment he will select according to his height. For example, a very short passenger or driver will move the seat forward as far as possible in the lengthwise direction of the vehicle for comfort and to have the steering wheel and switches and knobs on the instrument board within easy reach, as well as being able to reach the gas pedal, brake, and clutch pedal (if any) of the vehicle with his feet. A rather tall driver or passenger, with a correspondingly high head level, will normally move the seat as far back as he can for the sake of comfort or for room to place his legs in position to operate the foot pedals. The two extreme seat positions will thus be associated with the highest and lowest headrest settings; namely, with the seat moved as far forward as possible for a short person the headrest would be at its lowest setting, and for the seat moved as far back as space permits for a taller person, the headrest would move to its highest position. Correspondingly, for intermediate seat positions, the headrest would likewise be moved to an intermediate height.

Typically, the preferred length of travel of the headrest between its highest and lowest position is about half the lengthwise travel of the seat between its extreme back and forth positions so that the headrest adjusting mechanism may be provided with a step down from the relative motion of the seat.

According to the invention, the means for adjusting the height of the headrest according to the lengthwise adjustment of the seat may be hydraulic, mechanical, or electronic in nature.

In one form of the invention, a first hydraulic cylinder is connected between the backrest of the seat and headrest to move it between positions, and a second hydraulic cylinder is attached between the seat and the vehicle floor so that the piston is actuated in response to movement of the seat back and forth. The hydraulic pressure chambers of the two piston and cylinder units, on either side of the piston in each, are connected by a pair of hydraulic lines, the lines connecting each pressure chamber of the cylinder so that upon actuation of the piston of the second piston cylinder unit, the piston of the first cylinder unit will thereby be actuated to move the headrest up or down depending upon which way the seat is moved. A valve means may be interposed in the hydraulic lines which except upon manual actuation will prevent inadvertent movement of the seat and the headrest. In a varied form, hydraulic fluid may be supplied under pressure to the hydraulic lines, within an appropriate valving arrangement to control automatically the piston and the cylinder movements to move the seat and headrest to a desired position.

In another form of the invention, a connecting member capable of transmitting tensile and compressive forces may be coupled to the headrest at one end and the vehicle body at its other end to move the headrest in accordance with seat movement. One such member may be a sheathed cable, the sheath of which is fixedly attached to the vehicle seat at one end and a fixed member on the seat backrest at its other end. The cable movable inside the sheath is attached at one end to a cross-support attached to a pair of sliding members for moving the backrest up and down, and attached at its other end to a fixed portion of the vehicle.

In another form of the invention, a pulley and cable arrangement, the cables attached between the vehicle body and the backrest and headrest, may be provided to move the headrest in response to back and forth movement of the seat. Finally, in another mechanical arrangement, a rack and pinion is employed, the rack coupled to the headrest, and the pinion coupled to a transmission, in turn actuated by movement of the seat longitudinally along the vehicle. In either the cable arrangement or rack and pinion arrangement, a servo-mechanism may be coupled for automatically actuating the adjustment mechanism attached between the vehicle floor and the headrest to move the seat back and forth and at the same time adjust the headrest.

Also, in the case of the sheathed cable, cable or pinion arrangement, step down gearing or motion is provided so that the relative length of vertical travel of the headrest is about half that of the longitudinal travel of the seat. If desired, one end of the shoulder belt, or a belt take up mechanism, may be attached to the side of the headrest. In such an arrangement, the shoulder articulation of the belt will vary in accordance with the height of the headrest, and thereby also vary with respect to the shoulder height of the driver or passenger.

BRIEF DESCRIPTION OF THE DRAWINGS

For a better understanding of the invention, reference may be had to the following detailed description of preferred embodiments, taken in conjunction with the accompanying drawings, in which:

FIG. 4 is a pictorial representation of a passenger seat having a mechanical adjusting arrangement including a connecting member capable of transmitting tensile as well as compressive forces, for adjusting the headrest in response to the lengthwise adjustment of the seat;

FIG. 5 is a pictorial view of another form of mechanical adjustment for adjusting the headrest in response to adjustment of the position of the seat and having a pair of cooperating cables actuatable in opposite directions; and FIG. 6 is a pictorial representation of another embodiment of a passenger seat having a mechanical adjusting arrangement including a rack and pinion gear arrangement and a transmission operable in response to movement of the seat and coupled to the pinion.

DETAILED DESCRIPTION OF PREFERRED EMBODIMENTS

Figure 1:
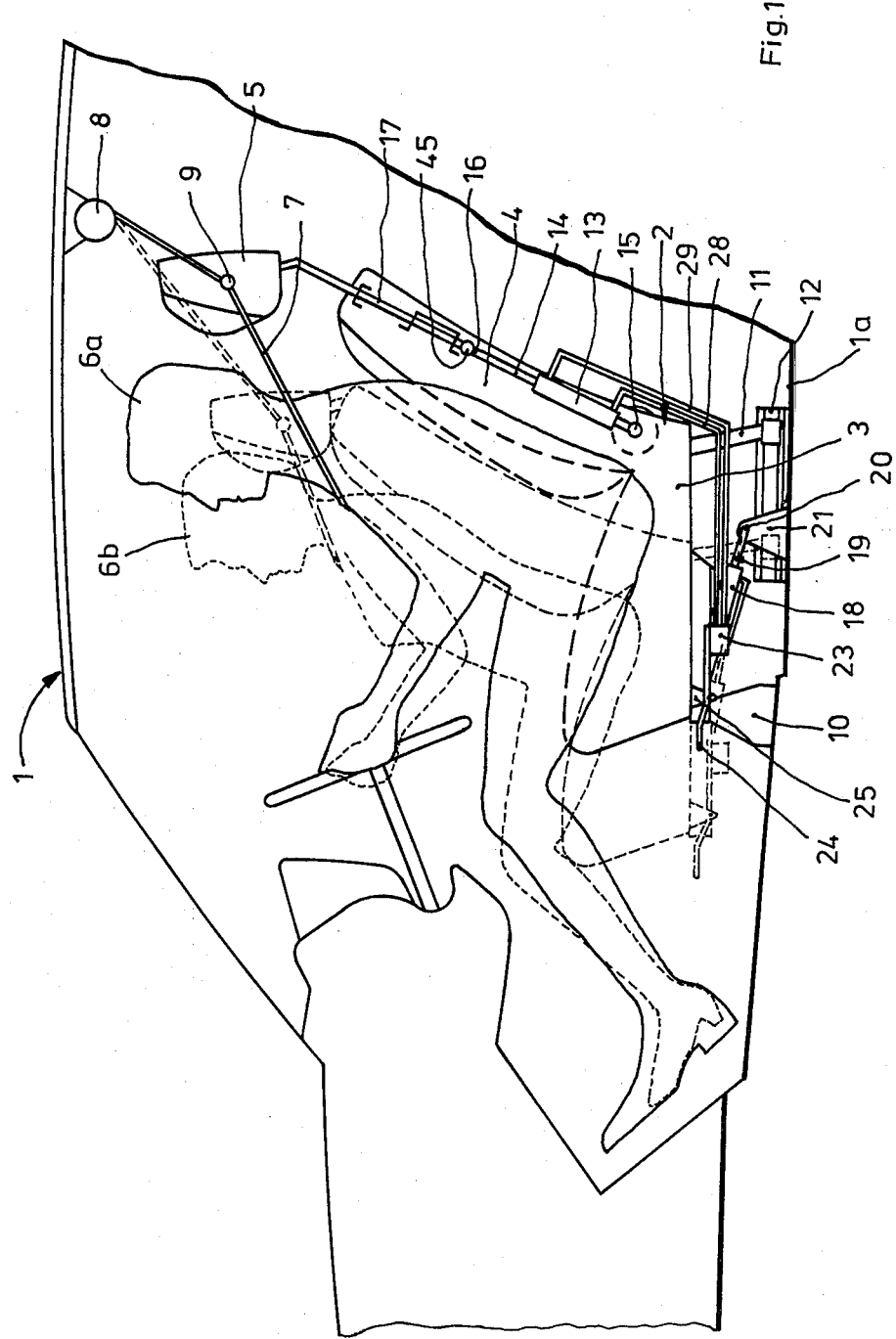
FIG. 1 is a side view of a longitudinally adjustable automobile driver seat installed in a vehicle and having a vertically adjustable headrest.

Referring to FIG. 1 of the drawings, a passenger or driver seat 2 is installed in a passenger motor vehicle 1, and is adjustable in the lengthwise direction of the vehicle. The seat has a frame 3 and a backrest 4 which may be pivotable. A headrest 5 is supported on the backrest 4 and vertically adjustable in relation thereto.

As shown in FIG. 1, the solid line represents the seat in its extreme rear position, as would be required for a relatively tall person 6a, and the dotted line configuration represents the seat 3 moved to its extreme forward position for a shorter passenger 6b. Corresponding with the forward and rearmost positions of the passenger seat 2, the corresponding extreme vertical positions of the headrest 5 are shown in solid and dotted lines, as in its highest position when the seat 3 is in the rearmost seat position, and in its lowest position when the seat is moved forward.

A conventional shoulder safety belt 7 is also shown in FIG. 1, which is designed to extend diagonally across the body of the passenger. The belt has an articulation point 9 on the side of the headrest 5, and is attached to a retraction system 8 in the roof of the vehicle. Alternatively, the retraction system may instead be mounted directly on the headrest 5 (see FIGS. 5 and 6). In either case, the articulation of the shoulder end of the belt at the headrest 5 results in automatic adjustment of the safety belt depending upon the height of the passenger, since the position of the articulation point 9 will change with the adjustment of the seat 3 and thereby headrest. Thus the belt will always be located at the optimum position to extend across the passenger without it becoming an encumbrance or a hazard.

In accordance with the form of the invention shown in FIG. 1, the adjustment of the headrest relative to the adjustment of the seat occurs using a hydraulic arrangement. A first piston and cylinder unit has a cylinder 13 attached at one end to the backrest 4 and a piston 31 (FIG. 2) capable of being moved back and forth within the cylinder 13 in response to a force in the hydraulic pressure chamber on either side of the piston 31. A piston rod 14 is attached at one end to the piston 31 and coupled at its outer end 16 to the headrest 5. Preferably the headrest 5 is connected to a pair of sliding rods 17 which are guided in the backrest 4. The slides 17 have a cross support member 45, to which the other end 16 of the piston rod 14 is attached.

A second piston and cylinder unit has a cylinder 18 attached at one end 22 to the frame of the seat 3 and a piston 30 and piston rod 19 attached at its outer end 20 to a lug 21 fastened to the floor 1a of the vehicle. The piston 30 in the second piston and cylinder unit likewise is capable of being acted upon on either side by pressure in one of the hydraulic pressure chambers in the cylinder 18.

The remaining seat design shown in FIG. 1 is that of a so-called three-legged seat, in which the seat is supported on a pair of rear side legs 11 in tracks 12 fastened to the floor 1a of the vehicle, and by a center front slide on the seat receiving a lug 10 affixed on the vehicle floor 1a.

Figure 2:
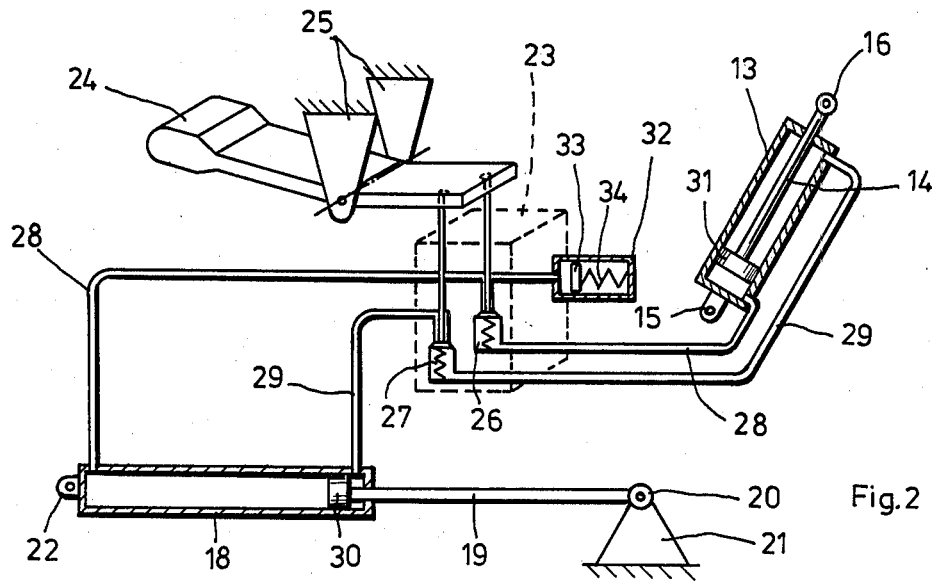
FIG. 2 is a schematic representation of a hydraulic apparatus for adjusting the headrest according to the lengthwise adjustment of the seat.

The hydraulic adjusting system is further shown in FIG. 2. The first piston and cylinder unit 13, 14, 31 and the second piston and cylinder unit 18, 19, 30 have a pair of hydraulic lines 28 and 29 interconnecting the two pressure chambers of the pistons 30 and 31. A valve arrangement 23 is interposed in the hydraulic lines 28 and 29 for shutting off the lines 28 and 29 when in the rest position, to prevent inadvertent movement of the seat 3 and headrest 5. A handle 24 pivoted on a lug 25 underneath the seat frame 3 of the passenger seat 2 may be provided for opening the valves 26 and 27 to permit the seat to be adjusted.

With the valves in their closed position, the hydraulic fluid present in the pressure chambers of the cylinders 13 and 18 and in the hydraulic lines 28 and 29, being incompressible, provides a force acting against movement in either direction of the seat and thus will prevent seat movement. When the valves 26 and 27 are opened by actuating the lever 24, the seat may be adjusted forward or back at will by the occupant. Movement of the seat in either direction will cause the cylinder 18 to move with respect to the piston 30 of the second piston and cylinder unit. This will force hydraulic fluid out of one pressure chamber of the cylinder 18 and through one of the hydraulic lines 28 or 29 into the corresponding pressure chamber of the first piston and cylinder unit. This, in turn, will cause the piston 31 in the first piston and cylinder unit to move, forcing hydraulic fluid out through the other hydraulic line and back into the other pressure chamber of the second piston and cylinder unit. The position of the two piston and cylinder units as shown in FIG. 2 corresponds to the forward position of the seat (indicated by the dotted lines of FIG. 1). Thus, by actuation of the lever 24 the seat could then be pushed backward. This would force hydraulic fluid out of the pressure chamber of cylinder 18 and through line 28 into the pressure chamber of cylinder 13 on the lower side of the piston 31 in the first piston and cylinder unit. As the piston 31 is forced upward, hydraulic fluid would be forced from the other side of cylinder 13 out through the hydraulic line 29 and back into the other side of the cylinder 18 to the right of piston 30 in the second piston and cylinder unit.

In accordance with a preferred embodiment of the invention, the face area of the piston 31 of the first piston and cylinder unit is about twice as large as the piston area of the piston 30 of the second piston and cylinder unit. If the piston 30, therefore, is displaced a certain distance in the cylinder 18, piston 31 will travel approximately half as far in cylinder 13. The headrest 5 connected to the outer end 16 of piston rod 14 of the first piston and cylinder unit would thereby be moved, relative to the backrest 4, a distance half as far as the length-wise displacement, relative to the floor, of the seat 3.

Referring to FIG. 2, a compensator 32 is connected to the hydraulic lines 28, 29 to accommodate an expansion or contraction of hydraulic fluid in the system as would occur, for example, by changes in temperature. The compensator consists of a piston 33 in the cylinder 32 which is biased by a spring 34. The piston 33 will thus yield elastically without damage to the adjusting system in the case of the expansion of the hydraulic fluid.

Figure 3:
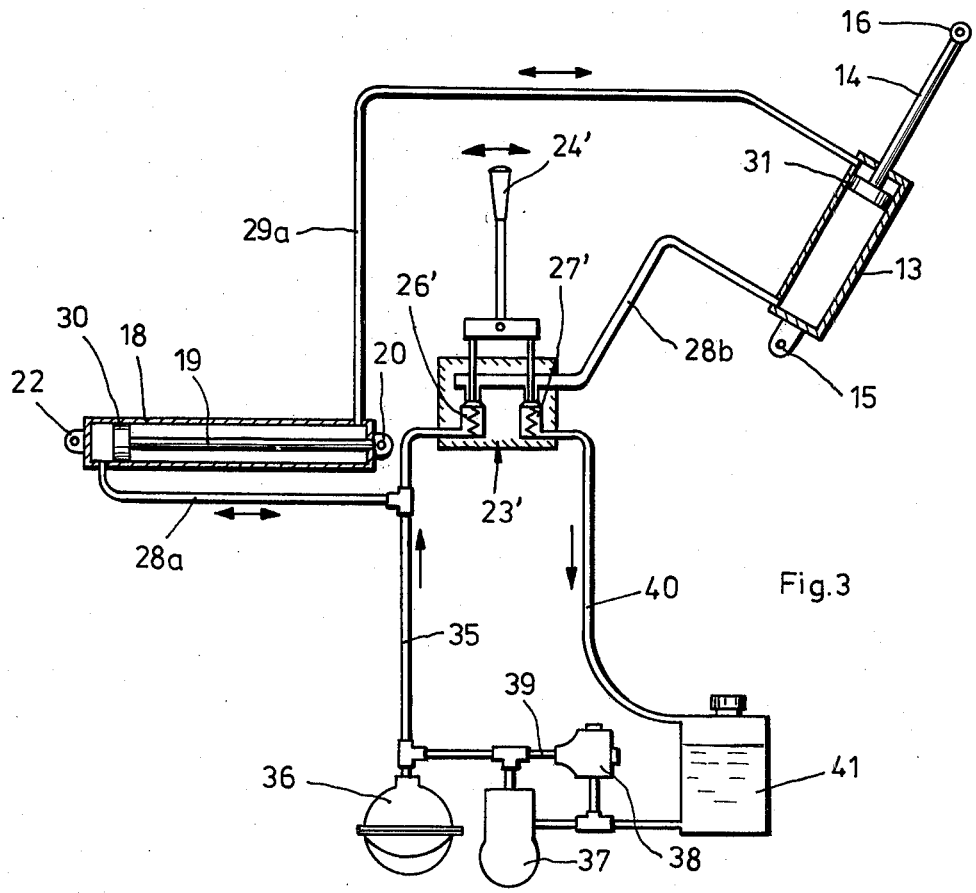
FIG. 3 is a schematic representation of a hydraulic adjusting apparatus having a pressure delivery system for power adjustment of the seat and headrest.

FIG. 3 represents an alternative form of hydraulic adjusting system, in which a power adjustment is included for adjusting the seats and headrests. A reservoir 36 is connected to one of the hydraulic fluid lines, e.g. 28a, by a line 35. The reservoir 35 is supplied from a tank 41 by a pump 37. An excess pressure valve arrangement 38 is interposed between the pump 37 and reservoir 36 to provide a return line opening at a predetermined maximum pressure on the pressure side of the pump, which would return fluid to the suction side of the pump. Thus a maximum pressure limitation will be provided on the pressure side of the pump and also in the reservoir 36 and the system of lines 35 and 28a connected to it.

A modified form of valve arrangement 23' suitable for this power operated system is shown in FIG. 3 and may be fixed underneath frame 3 of the seat 2 much like the valve means 23 in FIG. 21. Handle 24' is connected to the valve arrangement 23' and has 3 positions: in a first position line 28a is connected to line 28b; in a second position the connection between 28a and 28b is interrupted; and in the third position line 28b, leading to the first piston and cylinder unit 13, 14, 31, is connected to a line 40 leading to the supply tank 41, which would be under atmospheric pressure.

The lever 24' in the valve 23' provides an automatic power adjustment of the seat position and thus the headrest position. In the intermediate position the lever, shown in FIG. 3, the seat is locked in position, since no hydraulic fluid can move in either direction between the first and second piston and cylinder unit. When the lever 24' is moved towards the left, the pressure delivery system 35, 26, 37 is connected to line 28b, and will force fluid into the lower side of the cylinder 13 through line 28b to move the piston 31 upward as oriented in FIG. 2. This will consequently cause the cylinder 18 to move towards the right, and will force the seat backward. This occurs, even though the fluid pressure is as great in line 28a as it is in 28b, since the cross sectional area of the piston 31 is twice as large as that of the piston 30. Thus the force on the piston 31 will exceed that on the piston 30, causing the piston 30 to move upward in the first piston and cylinder unit 31 to force hydraulic fluid out through the line 29a and into the piston 18, thereby moving the piston 30 towards the left.

Once the seat has been moved into the desired position, the occupant can move the lever 24' back to its middle position where the two lines 28a and 28b are disconnected by the closed valve 26'. This will lock the seat and headrest into the selected position, because of the incompressibility of the hydraulic fluid in the lines 28a, 28b, and 29. Thus the seat will remain fixed. If the occupant desires to move the seat forward (and thus the headrest down), the valve lever 24' is moved towards the right, thus opening the valve 27', and connecting line 28b from the first piston and cylinder unit with the line 40 leading to the supply tank 41. This will eliminate the fluid under pressure in line 35 to move through hydraulic line 28a and force piston 30 towards this right hand position, forcing in turn hydraulic fluid out through the line 29a into the cylinder 13, and moving the piston 31 downward. Thus the occupant, simply by manipulation of the lever 24' can move the seat back and forth as he prefers, and at the same time a corresponding vertical adjustment of the headrest in accordance with the particular seat position will occur automatically.

Referring to FIG. 4, a passenger seat is shown in which the adjustment of the headrest in response to movement of the vehicle seat is by a mechanical arrangement. The arrangement includes a connecting member 46 capable of transmitting forces in tension and compression. One end 47 of the connecting member 46 is attached to a cross-piece 45 arranged between the two slide rods 17 of the headrest 5. The other end 48 of the member 47 is attached to a swinging lever 49 pivoted between an arm 20 articulated on a center lug 10 attached to the vehicle body 1a and a lug 50 attached to the seat frame 3. This connecting member 46 may, for instance, be a sheathed cable, for example a Teleflex element, designed to transmit the moving force of the lever 49 to the cross member 45. As thus shown, when the seat 2 is moved forward, the lever 49 pivots on lug 50, and moves the attachment point 48 of the cable of the connecting member toward the fixed attachment point 51 of the sheath fixed on the seat frame 3. The cable of the connecting member 46 will thus be forced out the same distance from the other end of the sheath and move the cross member 45 and thus the headrest 5 downward. The lever 49, however, due to the articulation arrangement, serves to decrease by one-half the travel distance the headrest relative to the forward or rearward travel of the seat. FIG. 4 does not specifically show an arrangement for locking the seat and headrest, once adjusted, in position, but this may be done in a conventional manner.

FIG. 5 shows another mechanical adjusting arrangement for the headrest 5 responsive to movement of the seat 2 back and forth. This arrangement consists essentially of two opposed cable arrangements 55 and 60. The cables 55, 60 are essentially guided on the backrest 4 and one of the slide legs 11 of the seat, with their ends being connected to the floor of the vehicle forward and behind the leg 11, respectively. Their other ends are attached to the cross support 45 attached to the headrest 5. One end 56 of a cable 55 is attached to the floor of the vehicle in front of the guide rail 12 in the longitudinal direction of the vehicle. The cable 55 extends around a pulley 57a on the leg 11 of the seat 2 to the backrest 4 and around another pulley 57b to the cross support 45 from above. The cable is attached to the crosssupport 45 by a pulley 58, and thereafter its free end 59 is attached to a cross piece 65 fixed on the backrest above the cross support 45, thus forming a block and tackle arrangement. The other cable 60 is fastened to the floor at one end 61 behind the guide rail, and thereafter extends over a pulley 62a on the leg 11 to a pulley 62b on the backrest 4. Thereafter, this cable is also rigged in a block and tackle arrangement over a pulley 63 on the moveable cross support 45 with its free end 64 attached to another cross piece 66 of the backrest 4 below the cross piece 45. The block and tackle rigging of the cables 55 and 60 serves to halve the travel distance of the headrest relative to the travel of the seat 2. As can be seen, however, adjustment of the seat by the passenger automatically adjusts the position of the headrest to the level corresponding to the particular seat position. In the embodiment shown in FIG. 5, once again a locking arrangement for the seat once it is in a desired position is not specifically shown. Such conventional mechanisms are known, however.

FIG. 6 shows another mechanical adjusting arrangement for adjusting the position of the headrest 5 in response to movement back and forth of the passenger seat. In this case, the adjustment mechanism for moving the headrest 5 is a rack and pinion arrangement 70, 71. A rack is attached to the cross support 45 connected to the headrest 5 and meshes with the pinion 71. The pinion 71 is fixed on a shaft 72 mounted on the backrest 4, which in turn is driven by a transmission consisting of two gears 73, 75 and a gear belt or chain 74 between the two gears. The lower gear 75 in turn is coupled to a cable wheel 76 driven by a cable 77. The two ends 78 and 79 of the cable 77 are fastened to the floor in front and behind the guide rail 12, so the cable 77 extends in the longitudinal direction of the vehicle. The cable 77 is passed over pulleys 80 on the side leg 11 of the seat 2 and thereafter over the cable wheel 76. When the seat 2 is moved in the lengthwise direction of the vehicle, the cable 77 will rotate the wheel 76, which in turn will actuate the transmission 75, 73, and thus the pinion 71. Therefore, as the seat is moved back and forth, the headrest 5 will likewise move up and down. The transmission gears as well as the rack and pinion are designed and sized so that the headrest 5 again will travel about half as far as the passenger seat, so that again the headrest will assume automatically the optimum position relative to the driver or passenger's head in response to the movement of the seat.

In FIG. 6, a servomotor 81 is also shown which is capable of actuating the cable wheel 76 or cable 77 in either selected direction. When such a servomechanism is provided, the seat can be adjusted automatically, that is by a power adjustment, and at the same time would lock the seat in position when not actuated. As is apparent, a servomoter could also be supplied in connection with the embodiment shown in FIG. 5. FIGS. 5 and 6 also show a retraction system 8' of a diagonal shoulder strap 7 mounted on a side of the headrest 5. This, of course, requires that the backrest is rigid enough to withstand the restraining forces acting on the belt in the case of an accident.

Although the invention has been shown and described with reference to certain preferred embodiments thereof, it will be understood that variations and modifications will be apparent to those skilled in the art while not departing from the inventive principles disclosed herein. All such variations and modifications are intended to be within the scope of the present invention, as defined in the following claims.

I claim:

1. In an automobile driver or passenger seat, said seat adjustable in the lengthwise direction of the vehicle and having a backrest, and a headrest supported on said backrest and vertically adjustable in relation thereto, the improvement comprising means for adjusting automatically the position of said headrest in response to lengthwise movement of said seat for moving said headrest upwardly away from said backrest when said seat is moved backward, and for moving said headrest downwardly when said seat is moved forward.

2. An automobile seat according to claim 1, wherein said means for automatic adjustment are adapted so that the length of travel of said headrest is about half the corresponding length of travel of said seat for any given longitudinal distance of movement of said seat.

3. An automobile seat according to claim 1 or 2, wherein said means for automatic adjustment of the headrest comprise hydraulic means.

4. An automobile seat according to claim 3, wherein said hydraulic means comprises a first cylinder and piston unit connected between said headrest and said backrest, a second piston and cylinder unit connected between said seat and the floor of the vehicle, said piston of each said piston and cylinder units dividing said cylinder into a first and second hydraulic pressure chamber, a first hydraulic line connected between said first hydraulic pressure chambers, and a second hydraulic line connected between said second hydraulic pressure chambers, and a valve means in said first hydraulic line for controlling the flow through said hydraulic lines and thereby to prevent inadvertent movement of the seat when said valve is closed interrupting said first line.

5. An automobile seat according to claim 4, further comprising a valve means in said second hydraulic line.

6. An automobile seat according to claim 4, wherein said valve means is manually actuatable, thereby to permit lengthwise adjustment of said seat.

7. An automobile seat according to claim 6, wherein one of said hydraulic lines communicates with a compensator means for enlarging the overall hydraulic volume in said hydraulic means for compensating for changes in the hydraulic fluid volume.

8. An automobile seat according to claim 7, wherein the piston associated with said first piston and cylinder unit has about double the cross-sectional area of the piston associated with said second piston and cylinder unit, the piston associated with said first piston and cylinder unit thereby having about half a relative length of travel with respect to a corresponding length of travel of the piston associated with said second piston and cylinder unit.

9. An automobile seat according to claim 4, wherein in said hydraulic means comprises a pressure delivery means for providing hydraulic fluid under pressure, and means for automatically adjusting said seat and said headrest.

10. An automobile seat according to claim 9, wherein said pressure delivery means comprises a pressure reservoir connected to said first hydraulic line and a pump means for providing hydraulic fluid under pressure to said reservoir, said pump means including delivery pressure limiting means for limiting the pressure of said hydraulic fluid delivered from said pump.

11. An automobile seat according to claim 10, wherein said pressure reservoir is connected between said valve means and said second piston and cylinder unit.

12. An automobile seat according to claim 11, wherein said valve means has a first position adapted for connecting said pressure reservoir through said first hydraulic line with both said first piston and cylinder unit and said second piston and cylinder unit, a second position adapted to interrupt said first hydraulic line, and a third position adapted to connect said first piston and cylinder unit through said first hydraulic line to atmosphere.

13. An automobile seat according to claim 1 or 2, wherein said means for adjusting said headrest comprise mechanical means.

14. An automobile seat according to claim 13, wherein said mechanical means comprises a connecting member capable of transmitting compression and tension forces and coupled between said vehicle body and said headrest.

15. An automobile seat according to claim 13, wherein said headrest is supported by a pair of slide rods, said slide rods having a cross-support member therebetween, said seat is supported on a pair of seat legs adjustable lengthwise of said vehicle, and wherein said mechanical means comprises a first cable attached at one end in front of one of said seat legs and at its other end to said cross-support, a second cable attached at one end behind said seat leg and at its other end to said cross-support, and guide means on said seat for guiding said first and second cables for moving said cross-support, and thereby said headrest, vertically in response to lengthwise movement of said seat.

16. An automobile seat according to claim 15, wherein said first cable and said second cable are connected to said cross-support member by a pulley, and said other end of each said first and second cable is attached to said seat to form a block and tackle arrangement with respect to said cross-support.

17. An automobile seat according to claim 13, wherein said mechanical means comprises a rack coupled to said headrest and a pinion engaging said rack and rotatably mounted on said backrest, a cable attached at each end to said vehicle to extend longitudinally therealong, and transmission means on said seat coupled between said cable and said pinion for actuating said transmission and for rotating said pinion in response to back and forward movement of said seat.

18. An automobile seat according to claim 15 or 16, further comprising servomechanism means for driving said cables through said guide means thereby to move said seat back and forth.

19. An automobile seat according to claim 17, further comprising servomechanism means for driving said transmission means thereby to move said seat back and forth.

20. An automobile seat according to claim 1, wherein said seat includes a safety belt means associated therewith, and said safety belt means are attached at one end to said seat on said headrest thereby to be adjustable in response to the longitudinal position of the seat.

* * * * *

UNITED STATES PATENT AND TRADEMARK OFFICE
CERTIFICATE OF CORRECTION

PATENT NO. : 4,285,545
DATED : August 25, 1981
INVENTOR(S) : Dieter Protze

It is certified that error appears in the above—identified patent and that said Letters Patent is hereby corrected as shown below:

First page, Item 30, "Nov. 3, 1978" should read --Mar. 11, 1978--
Column 6, line 61, "crosssupport" should read --cross-support--;
Column 7, line 48, "servomoter" should read --servomotor--.

Signed and Sealed this

Twenty-third Day of March 1982

[SEAL]

Attest:

GERALD J. MOSSINGHOFF

Attesting Officer

Commissioner of Patents and Trademarks